Figure 1:
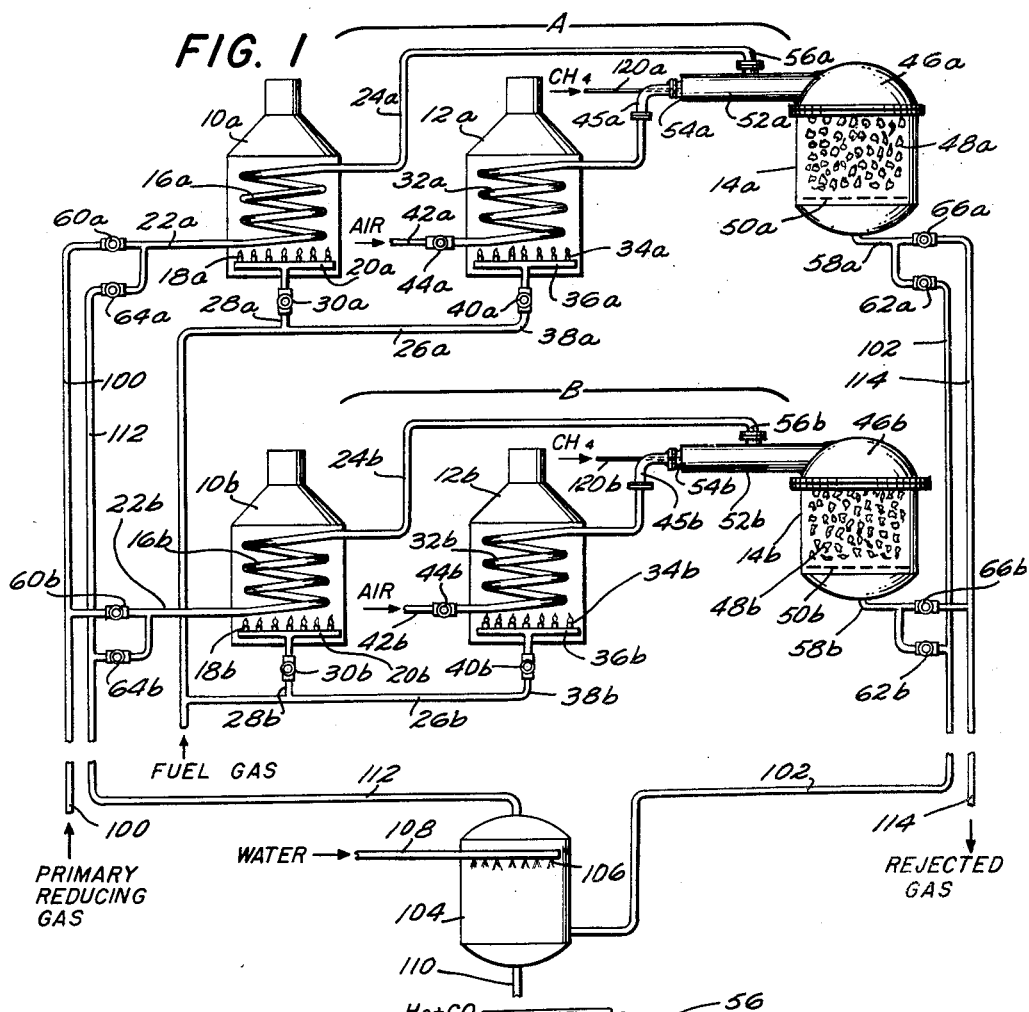

April 7, 1964   J. CELADA   3,128,174
METHOD OF MAKING SPONGE IRON
Filed June 26, 1959

INVENTOR.
JUAN CELADA
BY
Curtis, Morris & Safford
his ATTORNEYS

United States Patent Office 3,128,174
Patented Apr. 7, 1964

3,128,174
METHOD OF MAKING SPONGE IRON
Juan Celada, Monterrey, Nuevo Leon, Mexico, assignor to Fierro Esponja S.A., Monterrey, Nuevo Leon, Mexico
Filed June 26, 1959, Ser. No. 823,236
3 Claims. (Cl. 75—34)

This invention relates to the production of sponge iron by the reduction of iron ore with reducing gas and more particularly to improvements in the method of and apparatus for reducing iron ore described and claimed in my prior application Serial No. 676,072, filed August 5, 1957, and entitled Method of Making Sponge Iron, now Patent 2,900,247, issued August 18, 1959, of which prior application the instant application is a continuation-in-part.

In accordance with a preferred embodiment of the method described and claimed in my prior application, a stream of reducing gas composed largely of hydrogen and carbon monoxide is heated to a temperature in the range of 1300° F. to 1750° F., a stream of air is separately preheated to a temperature of 1300° F. to 1750° F. and the preheated air is continuously mixed with the heated gas at controlled rates to cause a portion only of the reducing gas to be burned and thereby raise the temperature of the mixed gas stream to 1800° F. to 2250° F. The resulting hot reducing gas mixture is then passed through a bed of ore to reduce the ore to metallic iron. It has been found that ore conversions of 95% or better can readily be obtained in periods of 3 to 4 hours.

While the above described method operates very satisfactorily to produce sponge iron, the burning of the reducing gas consumes part of the reducing constituents thereof, and considerably dilutes the gas with inert constituents, water and carbon dioxide. Furthermore, the water and carbon dioxide thus produced, in addition to diluting the reducing gas mixture, inhibit reduction of the iron ore by the hydrogen and carbon monoxide of the gas mixture because of the mass action effect.

One object of the present invention is to provide an improved method of and apparatus for making sponge iron from iron ore which increases the quantity of sponge iron converted from a batch of iron ore during a given period of time.

Another object is to provide an improved method of and apparatus for preparing an ore-reducing gas having a high temperature and a high concentration of reducing constituents.

Another object is to provide a method of and apparatus for heating an ore-reducing gas to a high temperature which reduces the amount of water and carbon dioxide in the gas mixture reacting with the iron ore.

Another object is to provide an improvement in the method of heating ore-reducing gas to a high temperature by separately preheating streams of reducing gas and air and burning part of the reducing gas with said air, which includes injecting and burning a hydrocarbon gas in the preheated air to provide part of the heat and reducing constituents to decrease the amount of reducing gas consumed, and to improve the quality of the reducing gas mixture.

Still another object is to provide an apparatus for improving the reduction of iron ore to sponge iron which is of simple and compact construction, economical to manufacture and reliable in operation.

These and other objects will become more apparent from the following description and accompanying drawing.

The objects of the present invention may be achieved in general by a modification of the process disclosed in Patent No. 2,900,247 referred to above. More particularly, in accordance with the present method, the preheated air stream of my prior process has added thereto before being mixed with the reducing gas stream, a quantity of a gaseous hydrocarbon, which is burned in the air stream to provide a portion of the heat required in the final gas mixture that is fed to the reactor.

The addition of the gaseous hydrocarbon to the air stream provides a number of advantages. In the first place it decreases the amount of reducing gas constituents oxidized by the air stream and thereby provides a richer gas mixture. Moreover this objective is achieved with a material (the hydrocarbon) that is less expensive than the reducing gas. Also less water and carbon dioxide will be produced. Moreover by proper design of the combustion chamber and the use of proper flow rates, the combustion of hydrocarbon in the air stream can be made to produce reducing compounds that are incorporated in the final gas mixture.

In general, any volatile hydrocarbon can be used as the gaseous hydrocarbon of the present method. Satisfactory results have been obtained when using the lower alkanes and mixtures thereof such as methane and natural gas.

It has been found that the quantity of added hydrocarbon should desirably be less than that theoretically reactable with the air. The optimum relative proportions of hydrocarbon and air vary somewhat with the nature of the hydrocarbon used. In general somewhat lesser proportions of the higher molecular weight hydrocarbon should be employed. For the common gaseous hydrocarbons, a satisfactory range is 1% to 15% by weight hydrocarbon based on the weight of air with which it is mixed.

In order to point out more fully the nature of the present invention reference will now be made to the accompanying drawing which illustrates apparatus capable of carrying out the present method and incorporating a preferred embodiment of the apparatus invention.

Figure 2:
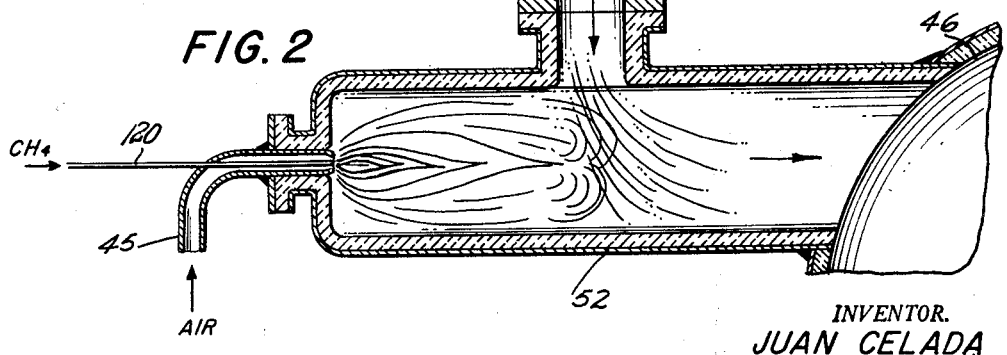

In the drawings:

FIGURE 1 is a diagrammatic view of a system for reducing ore in accordance with the method of the present invention; and FIGURE 2 is an enlarged sectional view of the mixing chamber connected to the reactor and showing the nozzle for injecting a fuel gas at the inlet for the preheated air.

Referring to FIGURE 1, the system for carrying out the process for producing sponge iron from iron ore will now be described. The ore reducing system shown in the drawing comprises two reduction units generally designated A and B, respectively, each of which comprises a reducing gas preheater, an air preheater and a reactor.

In patent No. 2,900,247, referred to above, three such units are shown and each unit operates on a six hour cycle. Each unit is maintained "on stream," that is, with reducing gas flowing through the ore bed during a four hour period and the reactor is dumped and reloaded during the other two hour period. During the four hour period, each reactor is on a stream of secondary gas for a period of two hours to partially reduce the ore and then on a stream of primary reducing gas for another two hours to complete the reduction. In the illustration in the instant application only two units are included to show the steps of the method, but it will be understood that the method would be practiced with three units.

More particularly, the system shown comprises the reducing gas preheaters 10a and 10b for preheating the reducing gas as described above, the air preheaters 12a and 12b for preheating air and the reactors 14a and 14b wherein the iron is reduced to sponge iron. Since the reduction units A and B are of similar construction only one of the units A will be described in detail.

The reducing gas preheater 10a comprises a helical heat exchange coil 16a through which the reducing gas flows and is heated by the gas burners 18a supplied with a fuel gas from the header 20a. The reducing gas to be heated is supplied through a conduit 22a to the inlet of the heat transfer coil 16a where it is heated by the products of combustion from the burner 18a to a temperature of, for example, 1600° F. and leaves the preheater through conduit 24a. The operation of burner 18a is controlled by a regulating valve 30a in a branch line 28a between the burner and gas supply line 26a.

Air to be used for heating the reducing gas to a high temperature is preheated in the air preheater 12a which contains a heat exchange coil 32a heated by a burner 34a. Fuel gas is supplied to the burner 34a from the fuel gas supply line 26a through a branch conduit 38a having a regulating valve 40a. Air to be preheated is supplied under pressure through a conduit 42a containing a regulating valve 44a to the inlet end of coil 32a and flows through the coil wherein it is heated to a temperature of, for example, 1600° F. by the burners 34a. The preheated air leaves the preheater 12a through conduit 45a.

A batch of the iron ore to be reduced is contained in a vertically arranged cylindrical reactor 14a having a flanged cover 46a and containing the comminuted ore bed 48a supported on a foraminous plate or grate 50a. A gas mixing chamber 52a is connected to the cover 46a of the reactor 14a. The reducing gas conduit 24a is connected to the mixing chamber 52a at one side thereof intermediate its ends to supply a continuous stream of preheated reducing gas to the mixer, the air conduit 45a is connected to the left hand end 54a of the mixing chamber to supply a continuous stream of preheated air thereto and the right hand end of the mixing chamber is connected to the reactor 14a. The preheated air provides a supply of oxygen for supporting partial combustion in the mixing chamber 52a to increase the temperature of the reducing gas. The reducing gas mixture at high temperature then flows from the mixing chamber 52a into the top of reactor 14a down through the bed 48a wherein it reduces the iron ore to sponge iron and then out through a gas discharge pipe 58a.

The reduction unit B is similar to the unit A and the same parts in the different units are identified by the same reference characters with the letters a and b added to designate the particular unit.

Referring to the lower left hand portion of FIGURE 1 of the drawing, a primary reducing gas is supplied to the several units A and B from a gas main 100 connected to the supply pipes 22a and 22b of the units A and B, respectively. Valves 60a and 60b are provided in the supply pipes 22a and 22b for selectively connecting either of the units A and B to the supply main 100 and regulating the flow of gas thereto.

The primary reducing gas is composed largely of hydrogen and carbon monoxide which may be prepared in any of various known ways. For example, if the ore treatment is to be performed in an area where natural gas is available, the natural gas can be mixed with steam and catalytically converted to hydrogen and carbon monoxide in accordance with a known commercial process. Alternatively, the well-known water gas reaction can be used to produce a gas mixture of the desired composition. A typical primary reducing gas comprises approximately the following composition: hydrogen 72%, carbon monoxide 14%; carbon dioxide 7%; methane 5%; water 1%; nitrogen 1%.

Assuming for purposes of description that primary gas is being supplied only to the Unit A, it has been found that when a gas relatively rich in reducing constituents is used, the gas leaving the reactor 14a through pipe 58a after a single pass through the ore bed still contains sufficient reducing power to be advantageously re-used for initial reduction of ore. Hence, the system includes means for recycling the partially used reducing gas. For convenience in the description, the rich reducing gas supplied from main 100 will be referred to as primary reducing gas and the gas leaving the reactor 14a after having made a single pass therethrough will be referred to as secondary gas.

Pipe 58a is connected by means of valve 62a with a secondary gas recycle pipe 102. The primary gas after passing through the bed of ore in reactor 14a contains water vapor formed as an incident of the reduction reaction and this water is desirably removed from the secondary gas before it is re-used. Accordingly, the secondary gas is conducted through the recycle pipe 102 to a quencher 104 provided with a spray head 106 supplied with water through a pipe 108. The secondary gas flows through the quencher 104 in a direction counter-current to the sprayed water and is thereby cooled and dehumidified. The dehumidified secondary gas leaves the quencher through pipe 112 and the spray water leaves the quencher through the pipe 110. Supply pipe 112 is connected to the reducing supply pipe 22b by means of the valves 64b. If desired, the secondary gas can be enriched by mixing primary gas therewith, by partially opening valve 60b, to give the desired concentration of reducing constituents.

The secondary gas is preheated to a temperature of, for example, 1600° F. in preheater 10b and mixed with air preheated to, for example, 1600° F. in preheater 12b in the mixing chamber 52b and the resulting mixture delivered to the reaction chamber 14b. After the secondary gas has made a second pass through an ore bed in reactor 14b it is rejected from the system. Such gas to be rejected is discharged from the reactor 14b through the discharge pipe 58b which is connected by means of valve 66b with the reject or exhaust gas header 114 through which the gas is conducted from the system. It is to be noted that the rejected gas still has sufficient heating value to be used as a fuel for heating a boiler or other heating purposes as, for example, it may be supplied through gas supply lines 26a and 26b to the burners 18a, 18b and 34a, 34b of the gas and air preheaters 10a, 10b and 12a, 12b. As thus far described, the method and apparatus is essentially the same as that described and claimed in Patent No. 2,900,247, referred to above.

In accordance with the method of the present invention, a hydrogen in gaseous form is injected into the preheated air as it enters the mixing chamber and is burned to provide part of the heat required to increase the temperature of the reducing gas mixture. The gas may be injected at atmospheric temperature, but preferably it is preheated to 1600° F. corresponding to the temperature of the preheated air. Such injection of the gasiform hydrocarbon into the air stream decreases the consumption of the reducing gas supplied to the mixing chamber and may, depending upon the amount of hydrocarbon injected, reduce the concentration of water and carbon dioxide in the reducing gas mixture leaving the mixing chamber. Furthermore, the burning of the hydrocarbon gas if properly adjusted may produce reducing constituents for mixture with the reducing gas supplied to the mixing chamber to decrease the dilution and contamination of the resulting gas mixture over that which results when the total supply of heat required to raise the reducing gas temperature to say 2100° F. is produced solely by burning part of the reducing gas supplied to the chamber.

The injected hydrocarbon gas may comprise methane, natural gas or a vaporized liquid hydrocarbon. The amount of hydrocarbon gas supplied may vary from a very small quantity, such as 1% by weight to as much as 15% by weight of the air supplied with a corresponding improvement in the properties of the reducing gas mixture.

Referring now to FIGURE 2 of the drawings, the apparatus for carrying out the step of injecting hydrocarbon gas comprises a tube 120 for supplying gas to one end of the mixing chamber 52 for each of the units A and B. The end of tube 120 extends axially through the air supply line 45 with its end terminating at the end of the air inlet. This construction produces a flame at the outlet end of the tube 120 with an annular mantle of air between the flame and the interior wall of the chamber 52 at all times.

As the fuel gas enters the chamber 52 it is burned at high temperature with a flame projecting into the chamber and spaced from the side walls thereof. The annular mantle of air surrounding the flame provides the oxygen required to support the combustion and an insulating mantle of relatively cool gas surrounding the flame. The products of combustion impinge upon the stream of reducing gas entering the chamber through the pipe 56 closely adjacent to the flame and produce a turbulence and thorough mixing of the combustion products and reducing gas. This constructional arrangement maintains the temperature at the sides of the chamber within permissible limits and insures a uniform mixing of the gases and distribution of heat throughout the gas mixture.

It will now be observed that the present invention provides a method of and apparatus for making sponge iron from iron ore which produces improved results over previously used methods. It will still further be observed that the present invention provides an improved apparatus for performing the method of making sponge iron from iron ore which is of simple and compact construction, economical to manufacture and reliable in operation.

While a single embodiment of the invention is herein illustrated and described, it will be understood that changes may be made in the steps of the method and the construction of the apparatus without departing from the spirit or scope of the invention. Therefore without limitation in this respect the invention is defined by the following claims.

I claim:

1. In a method of preparing a hot reducing gas mixture adapted to be used for the reduction of iron ore to sponge iron of the type wherein a stream of preheated air is added to a heated reducing gas composed essentially of carbon monoxide and hydrogen, the amount of added air being such as to burn only partially the reducing constituents of the reducing gas to produce a reducing gas mixture at a temperature of 1800° to 2250° F., the improvement which comprises adding a gaseous hydrocarbon to and burning the said hydrocarbon in the air stream prior to admixture of the air stream with the reducing gas and in an amount insufficient to react with all of the oxygen of the air stream, whereby an oxidizing mixture is produced, and mixing said oxidizing mixture with said reducing gas to burn a portion only of said reducing gas, whereby a reducing gas mixture at 1800° F. to 2250° F. is achieved with a diminished consumption of the reducing constituents of said reducing gas.

2. A method according to claim 1 and wherein the amount of hydrocarbon gas used is from 1% to 15% by weight of the air stream.

3. A method according to claim 2 and wherein the hydrocarbon gas is preheated and injected into the interior of the air stream.

References Cited in the file of this patent

UNITED STATES PATENTS

| | | |
|---|---|---|
| 1,830,574 | Thwing | Nov. 3, 1931 |
| 2,528,552 | Royster | Nov. 7, 1950 |
| 2,577,730 | Benedict et al. | Dec. 11, 1951 |
| 2,837,419 | Sellers et al. | June 3, 1958 |
| 2,900,247 | Celada | Aug. 18, 1959 |